(12) United States Patent
Uebel et al.

(10) Patent No.: US 11,821,442 B2
(45) Date of Patent: Nov. 21, 2023

(54) HYDRAULIC ENERGY HANDLING SYSTEM, A HYDRAULIC PARALLEL HYBRID DRIVELINE AND A WORKING MACHINE

(71) Applicant: Volvo Construction Equipment AB, Stockholm (SE)

(72) Inventors: Karl Uebel, Kvicksund (SE); Robert Morelius, Eskilstuna (SE); Erik Norlin, Eskilstuna (SE)

(73) Assignee: Volvo Construction Equipment AB, Stockholm (SE)

( * ) Notice: Subject to any disclaimer, the term of this patent is extended or adjusted under 35 U.S.C. 154(b) by 416 days.

(21) Appl. No.: 17/285,384

(22) PCT Filed: Oct. 18, 2018

(86) PCT No.: PCT/EP2018/078583
§ 371 (c)(1),
(2) Date: Apr. 14, 2021

(87) PCT Pub. No.: WO2020/078555
PCT Pub. Date: Apr. 23, 2020

(65) Prior Publication Data
US 2021/0340998 A1 Nov. 4, 2021

(51) Int. Cl.
*F15B 1/00* (2006.01)
*F15B 1/02* (2006.01)
(Continued)

(52) U.S. Cl.
CPC .............. *F15B 1/024* (2013.01); *B60K 6/12* (2013.01); *E02F 9/2217* (2013.01)

(58) Field of Classification Search
CPC .............. F15B 1/024; F15B 3/00; B60K 6/12
(Continued)

(56) References Cited

U.S. PATENT DOCUMENTS 3,606,049 A * 9/1971 Gordon ................ B62D 11/183
417/62
7,475,538 B2 * 1/2009 Bishop ..................... E02F 9/22
60/567
(Continued)

FOREIGN PATENT DOCUMENTS

CN 103836009 A 6/2014
CN 104709065 A 6/2015
(Continued)

OTHER PUBLICATIONS

Chinese First Office Action dated Mar. 1, 2022 for Chinese Patent Application No. 201880098668.0, 16 pages (including English translation).

(Continued)

*Primary Examiner* — Hau V Phan
(74) *Attorney, Agent, or Firm* — Sage Patent Group

(57) ABSTRACT

A hydraulic energy handling system for a working machine includes a high-pressure side; a low-pressure side; a hydraulic machine for mechanically driving, and being mechanically driven by, a mechanical driveline of the working machine; at least one high-pressure hydraulic energy storage connected to the high-pressure side; a hydraulic motor; a hydraulic pump arranged to supply hydraulic fluid to an inlet side of the hydraulic motor; and a return line for conducting hydraulic fluid to a hydraulic tank. The system further includes a pressure relief valve between the high-pressure side and the return line and arranged to discharge excess hydraulic energy from the high-pressure side to the return line to provide a braking force on the mechanical driveline; and a priority valve arrangement connected to an outlet side of the hydraulic motor to direct a prioritized flow of hydraulic fluid to the low-pressure side.

16 Claims, 4 Drawing Sheets

(51) Int. Cl.
B60K 6/12 (2006.01)
E02F 9/22 (2006.01)

(58) Field of Classification Search
USPC .......................................................... 180/165
See application file for complete search history.

(56) References Cited

U.S. PATENT DOCUMENTS

| | | | |
|---|---|---|---|
| 8,118,132 B2* | 2/2012 | Gray, Jr. | B60W 30/18027 |
| | | | 180/305 |
| 8,997,476 B2* | 4/2015 | Brinkman | F15B 21/14 |
| | | | 60/456 |
| 9,429,170 B2 | 8/2016 | Krittian et al. | |
| 9,714,667 B2 | 7/2017 | Krittian et al. | |
| 9,745,972 B2* | 8/2017 | Krittian | E02F 9/2296 |
| 10,017,918 B2 | 7/2018 | Tsukada et al. | |
| 10,167,835 B2 | 1/2019 | Dölger et al. | |
| 2009/0008174 A1* | 1/2009 | Tikkanen | B60K 25/00 |
| | | | 180/165 |
| 2009/0210120 A1 | 8/2009 | Stein et al. | |
| 2010/0141024 A1 | 6/2010 | Fouquet et al. | |
| 2012/0060777 A1 | 3/2012 | Tikkanen et al. | |
| 2012/0077632 A1* | 3/2012 | Babbitt | B60K 6/12 |
| | | | 475/1 |
| 2013/0280111 A1* | 10/2013 | Hoxie | E02F 9/2217 |
| | | | 417/364 |
| 2014/0087916 A1 | 3/2014 | Johnson et al. | |
| 2015/0204355 A1* | 7/2015 | Krittian | B60K 6/48 |
| | | | 903/915 |
| 2017/0114518 A1 | 4/2017 | Zimmerman | |
| 2017/0175782 A1* | 6/2017 | Imura | E02F 9/2217 |
| 2017/0335867 A1* | 11/2017 | Meehan | E02F 9/2075 |

FOREIGN PATENT DOCUMENTS

| | | |
|---|---|---|
| DE | 3514375 A1 | 10/1986 |
| DE | 102010005319 A1 | 7/2010 |
| EP | 2792522 A1 | 10/2014 |
| EP | 3095999 A2 | 11/2016 |
| EP | 3153713 A1 | 4/2017 |
| JP | 2005096759 A | 4/2005 |
| WO | 2011104383 A1 | 9/2011 |

OTHER PUBLICATIONS

International Search Report and Written Opinion of the International Searching Authority, PCT/EP2018/078583, dated Nov. 19, 2019, 15 pages.

* cited by examiner

HYDRAULIC ENERGY HANDLING SYSTEM, A HYDRAULIC PARALLEL HYBRID DRIVELINE AND A WORKING MACHINE

CROSS REFERENCE TO RELATED APPLICATIONS

This application is a 35 U.S.C. § 371 national stage application of PCT International Application No. PCT/EP2018/078583 filed on Oct. 18, 2018, the disclosure and content of which is incorporated by reference herein in its entirety.

TECHNICAL FIELD

The invention relates to a hydraulic energy handling system for a working machine, a hydraulic parallel hybrid driveline for a working machine, and a working machine.

The invention is applicable on working machines within the fields of industrial construction machines, material handling machines or construction equipment, in particular wheel loaders. Although the invention will be described with respect to a wheel loader, the invention is not restricted to this particular machine, but may be used in any working machine where recuperation of braking energy is feasible, such as wheeled excavators, articulated or rigid haulers and backhoe loaders.

BACKGROUND

In connection with transportation of heavy loads, e.g. in construction work, working machines are frequently used. A working machine may be operated with large and heavy loads in areas where there are no roads, for example for transports in connection with road or tunnel building, sand pits, mines and similar environments.

To improve the fuel efficiency of the working machine, a hydraulic energy handling system may be used. Such hydraulic energy handling system may comprise a hydraulic machine (operative both as a hydraulic pump and as a hydraulic motor) attached to a mechanical driveline of the working machine and a hydraulic energy storage, such as one or more hydraulic accumulators. The hydraulic energy handling system can be charged when excess energy is available, for example by driving the hydraulic machine as a pump and charging the hydraulic accumulator with hydraulic fluid during braking of the working machine. The stored energy can then be returned to the mechanical driveline by driving the hydraulic machine as a motor with hydraulic fluid from the hydraulic accumulator in order to add driving torque to the mechanical driveline. In this manner, kinetic energy from the working machine can be recovered and used later to add power to the mechanical driveline. The hydraulic energy handling system may therefore be said to constitute a hydraulic flywheel.

US 2014087916 A1 discloses a hydraulic regeneration apparatus for a motor vehicle having an engine, a transmission and a drive shaft. The regeneration apparatus comprises two fixed displacement hydraulic pump/motors, a low-pressure hydraulic accumulator, a high-pressure hydraulic accumulator, a multifunction hydraulic manifold, and an electronic control system for receiving pressure information from the accumulators.

Since the capacity of the hydraulic energy storage is often comparatively low, the hydraulic energy storage will quickly be filled up to maximum when braking the working machine from high speed or during a long downhill slope. When the hydraulic energy storage is full, the braking with the hydraulic energy handling system must be aborted to avoid excessive pressure. It is then no longer possible to brake the working machine by charging the hydraulic energy storage. It is therefore necessary to initiate use of an alternative brake system, e.g. to avoid a dangerous situation. One solution is to control the service brakes by an electronic valve arrangement and thereby fade in the service brakes while fading out the hydraulic energy handling system. However, this solution requires continuous monitoring of the hydraulic energy storage, and an electronically controlled valve system for the service brakes, which is complex and expensive. Moreover, brake blending control algorithms are difficult to tune since the service brakes typically have a quite stiff behaviour, i.e. it is difficult to provide a smooth transition from the braking with the hydraulic energy handling system to the braking with the service brakes.

SUMMARY

An object of the invention is to provide a hydraulic energy handling system for a working machine, which hydraulic energy handling system has a simple, cheap, efficient and/or reliable design and/or operation.

The object is achieved by a hydraulic energy handling system for a working machine according to claim 1. This hydraulic energy handling system comprises a high-pressure side; a low-pressure side; a hydraulic machine for mechanically driving, and being mechanically driven by, a mechanical driveline of the working machine; at least one high-pressure hydraulic energy storage connected to the high-pressure side; a hydraulic motor having an inlet side and an outlet side; a hydraulic pump arranged to supply hydraulic fluid to the inlet side of the hydraulic motor; and a return line for conducting hydraulic fluid to a hydraulic tank. The hydraulic energy handling system further comprises a pressure relief valve connected between the high-pressure side and the return line, the pressure relief valve being arranged to discharge excess hydraulic energy from the high-pressure side to the return line in order to provide a braking force on the mechanical driveline; and a priority valve arrangement connected to the outlet side of the hydraulic motor, the priority valve arrangement being configured to direct a prioritized flow of hydraulic fluid to the low-pressure side.

During braking of the working machine, braking energy can be stored by pumping hydraulic fluid by means of the hydraulic machine from the low-pressure side to the high-pressure side where the hydraulic fluid is initially stored in the high-pressure hydraulic energy storage. When the high-pressure hydraulic energy storage is full and the braking of the working machine continues, the hydraulic pressure in the high-pressure side rises until the pressure relief valve automatically opens and hydraulic fluid flows from the high-pressure side to the return line. The flow of hydraulic fluid over the pressure relief valve allows the working machine to maintain the braking torque even when the high-pressure hydraulic energy storage is fully charged, without the need for electronically controlled valves to activate the service brakes of the working machine.

Due to the braking force provided by the pressure relief valve when the high-pressure hydraulic energy storage is full, the pressure relief valve may be said to constitute a retarder valve. The invention allows for a simple and seamless transition from the regenerative braking by charging the high-pressure hydraulic energy storage, to the non-regenerative braking by throttling hydraulic fluid through the pressure relief valve, without the need for additional software control and monitoring.

During a longer retarder braking sequence by throttling hydraulic fluid through the pressure relief valve, the supply to the suction side of the hydraulic machine may be reduced, e.g. as a low-pressure hydraulic energy storage is expended. The priority valve arrangement handles the distribution of flow of hydraulic fluid from the hydraulic motor to either the low-pressure side or the return line, where the flow to the low-pressure side is prioritized. Instead of unconditionally guiding the outlet flow of hydraulic fluid from the hydraulic motor to the return line, the priority valve arrangement directs a prioritized flow of hydraulic fluid to the low-pressure side should the hydraulic pressure in the low-pressure side be below a threshold value. Thereby, supply of pressurized hydraulic fluid to the suction side of the hydraulic machine is ensured.

Due to the positioning of the priority valve arrangement in series with the hydraulic motor, i.e. downstream of the hydraulic motor, an already existing hydraulic pump may be used to supply hydraulic fluid to the low-pressure side. Thereby, costs associated with a dedicated hydraulic pump can be avoided. Since the priority valve arrangement is arranged downstream of the hydraulic motor, the supply of pressurized hydraulic fluid to the suction side of the hydraulic machine can be accomplished without compromising the functionality of the hydraulic motor.

Furthermore, the hydraulic motor can be operated at full speed even when a large supply flow of hydraulic fluid is required by the hydraulic machine. The invention thereby effectively addresses the challenge of supplying pressurized hydraulic fluid to the hydraulic machine, while enabling full functionality of both the hydraulic motor and the hydraulic energy handling system. The hydraulic pump, the hydraulic motor and the priority valve arrangement may be said to constitute a supply system for the hydraulic energy handling system.

When accelerating the vehicle, hydraulic fluid is released from the high-pressure hydraulic energy storage to drive the hydraulic machine, which then functions as a motor. In this state, the hydraulic machine adds driving torque to the mechanical driveline and may thereby supplement or replace the driving torque from an internal combustion engine of the working machine.

The hydraulic machine may be coupled to the mechanical driveline via a clutch. By disengaging the clutch, the hydraulic energy handling system can be isolated from the mechanical driveline. Alternatively, the hydraulic machine may be permanently coupled to the mechanical driveline such that the hydraulic machine is always driven by (and always drives) the mechanical driveline.

The hydraulic energy handling system according to the invention may be configured to be used with a hydraulic parallel hybrid driveline of the working machine, where the hydraulic parallel hybrid driveline comprises the mechanical driveline. In this case, the hydraulic machine may be configured to mechanically drive, and to be mechanically driven by, the mechanical driveline of the hydraulic parallel hybrid driveline. With parallel is meant that the hydraulic energy handling system is supplementary to the mechanical driveline and does not interfere with normal operation of the mechanical driveline. Throughout the present disclosure, the terms high-pressure side and low pressure side mean that the pressure is higher in the high-pressure side than in the low-pressure side during operation of the hydraulic energy handling system.

The pressure relief valve may be configured to open automatically when a certain set pressure is reached on the high-pressure side, e.g. to operate only based on a set pressure on the high-pressure side. According to one embodiment, the pressure relief valve is hydromechanical. Since the pressure relief valve is not actively controlled, no additional software control is needed. Due to the absence of complex control, the switching to retarder braking by means of the pressure relief valve can be made seamless for the driver.

According to one embodiment, the hydraulic energy handling system further comprises a fan and the hydraulic motor is arranged to drive the fan. The prioritized flow of hydraulic fluid to the low-pressure side according to the invention is particularly advantageous during high power operations, where a large supply flow of hydraulic fluid to the hydraulic machine is needed at the same time as a high fan power is needed.

The hydraulic pump for the fan constitutes one of several suitable existing pumps that may be used to supply hydraulic fluid to the hydraulic energy handling system according to the present invention. By using an already existing hydraulic pump in the working machine, a dedicated fluid supply pump can be avoided.

According to one embodiment, the priority valve arrangement is configured to direct an excess flow of hydraulic fluid from the outlet side of the hydraulic motor to the return line. The priority valve arrangement may comprise a hydromechanical priority valve. Thus, the priority valve arrangement may function independently and may not require control from e.g. a central control unit of the working machine. The priority valve arrangement may however alternatively be electrically controlled e.g. based on a signal from an electronic sensor for sensing the set pressure on the low-pressure side. As a further alternative, the priority valve arrangement may comprise two on/off valves connected to the outlet side of the hydraulic motor, one connected to the low-pressure side and one connected to the return line.

According to one embodiment, the hydraulic energy handling system further comprises an anti-cavitation valve configured to allow hydraulic fluid to flow from the high-pressure side to the low-pressure side when a hydraulic pressure on the low-pressure side falls below a cavitation threshold value. The anti-cavitation valve thereby ensures to recirculate hydraulic fluid from the high-pressure side to the low-pressure side should the hydraulic pressure on the low-pressure side become critically low despite the supply from the priority valve arrangement, e.g. during a long downhill slope. Each of the at least one high-pressure hydraulic energy storage may be a hydraulic accumulator, such as a hydro-pneumatic accumulator.

According to one embodiment, the hydraulic energy handling system further comprises at least one low-pressure hydraulic energy storage connected to the low-pressure side. The low-pressure hydraulic energy storage can ensure a sufficient pressure on the low-pressure side to avoid cavitation before the priority valve arrangement directs a prioritized flow of hydraulic fluid to the low-pressure side.

The low-pressure hydraulic energy storage on the low-pressure side also enables the high-pressure side and the low-pressure side to be reversed. Also each of the at least one low-pressure hydraulic energy storage may be a hydraulic accumulator, such as a hydro-pneumatic accumulator.

According to one embodiment, the hydraulic energy handling system further comprises a control valve arrangement configured to selectively connect the hydraulic machine to the high-pressure side. According to one embodiment, the control valve arrangement may further be configured to selectively connect the high-pressure side to the low-pressure side. The control valve arrangement may however be omitted, for example in case the hydraulic machine is a four quadrant hydraulic machine.

According to one embodiment, the hydraulic energy handling system is for a hydraulic parallel hybrid driveline, Thus, the hydraulic energy handling system may be configured to be used in a hydraulic parallel hybrid driveline.

The invention also relates to a hydraulic parallel hybrid driveline for a working machine, where the hydraulic parallel hybrid driveline comprising a mechanical driveline and a hydraulic energy handling system according to the invention. In this case, the hydraulic machine may be arranged to mechanically drive, and to be mechanically driven by, the mechanical driveline of the hydraulic parallel hybrid driveline. Although not detailed herein, the hydraulic energy handling system of the hydraulic parallel hybrid driveline may alternatively form part of a hydrostatic transmission.

According to one embodiment, the mechanical driveline comprises a gearbox having a gearbox output shaft, and the hydraulic machine is arranged to mechanically drive, and to be mechanically driven by, the gearbox output shaft. The hydraulic machine may however be driven by, and drive, alternative components of the mechanical driveline. The hydraulic parallel hybrid driveline may further comprise an internal combustion engine. In this case, the hydraulic pump may be driven by the internal combustion engine.

The invention also relates to a working machine comprising a hydraulic energy handling system according to the invention or a hydraulic parallel hybrid driveline according to the invention. The working machine may be a wheel loader. Alternatively, the working machine may be a wheeled excavator, an articulated or rigid hauler or a backhoe loader.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
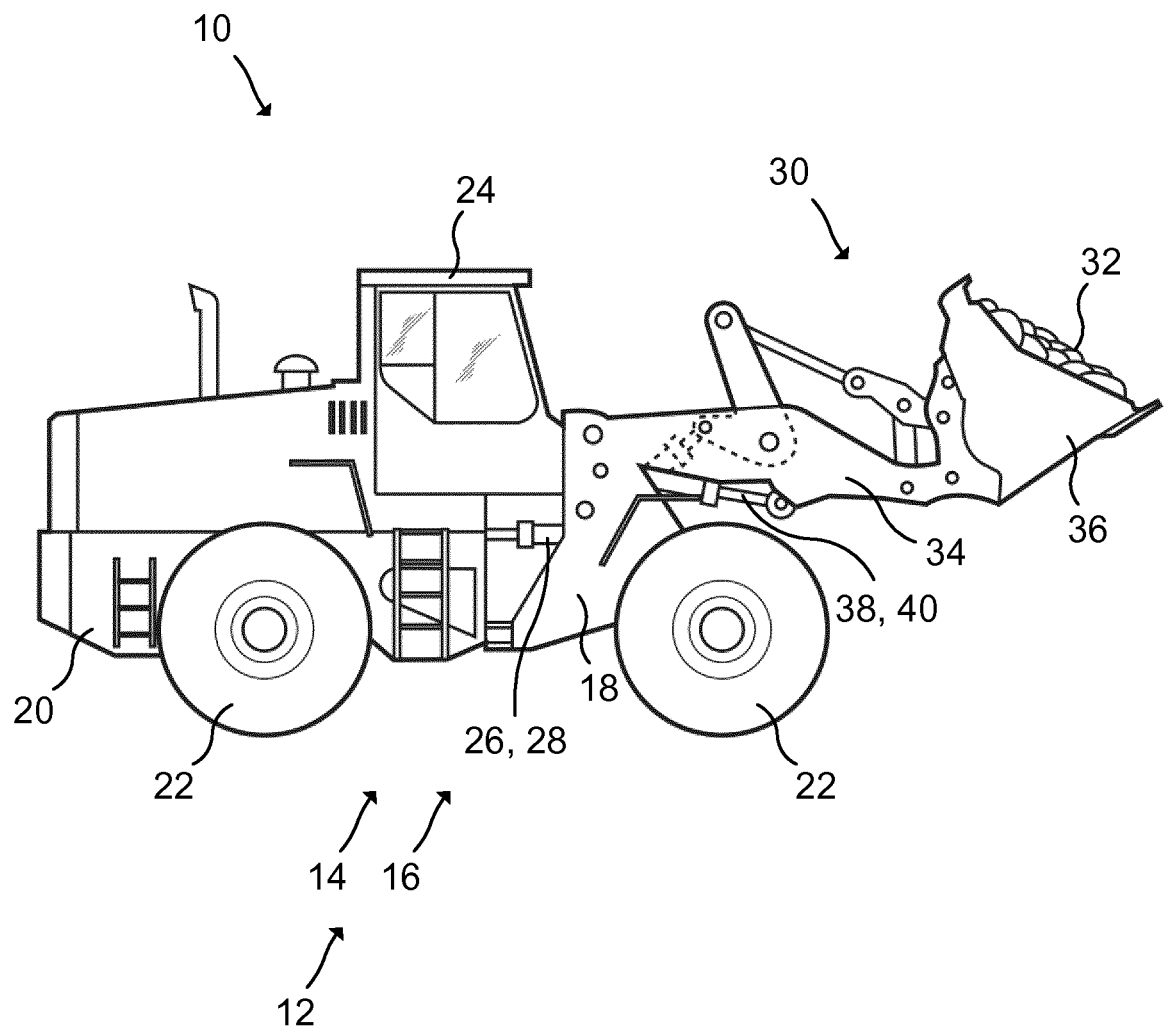
FIG. 1 is a schematic illustration of a working machine according to the invention comprising a hydraulic parallel hybrid driveline.

In the following, a hydraulic energy handling system for a working machine, a hydraulic parallel hybrid driveline for a working machine, and a working machine, will be described. The same reference numerals will be used to denote the same or similar structural features.

FIG. 1 is a schematic illustration of a working machine 10 according to the invention. The working machine 10 comprises a hydraulic parallel hybrid driveline 12, which in turn comprises a mechanical driveline 14 and a hydraulic energy handling system 16. The hydraulic parallel hybrid driveline 12 constitutes the propulsion system of the working machine 10.

The working machine 10 is here exemplified as a wheel loader comprising a front body section 18 and a rear body section 20, which sections each has an axle for driving a pair of wheels 22. The rear body section 20 comprises a cab 24. The body sections 18, 20 are connected to each other in such a way that they can pivot in relation to each other around a vertical axis by means of two first actuators in the form of hydraulic cylinders 26, 28 arranged between the two body sections 18, 20. The hydraulic cylinders 26, 28 are thus arranged one on each side of a horizontal centerline of the working machine 10 in a traveling direction in order to turn the working machine 10.

The working machine 10 further comprises an equipment 30 for handling objects or material 32. The equipment 30 comprises a load-arm unit 34, also referred to as a linkage, and an implement in the form of a bucket 36 fitted on the load-arm unit 34. A first end of the load-arm unit 34 is pivotally connected to the front body section 18. The bucket 36 is pivotally connected to a second end of the load-arm unit 34. The load-arm unit 34 can be raised and lowered relative to the front body section 18 of the working machine 10 by means of two second actuators in the form of two hydraulic cylinders 38, 40, each of which is connected at one end to the front body section 18 and at the other end to the load-arm unit 34.

Figure 2:
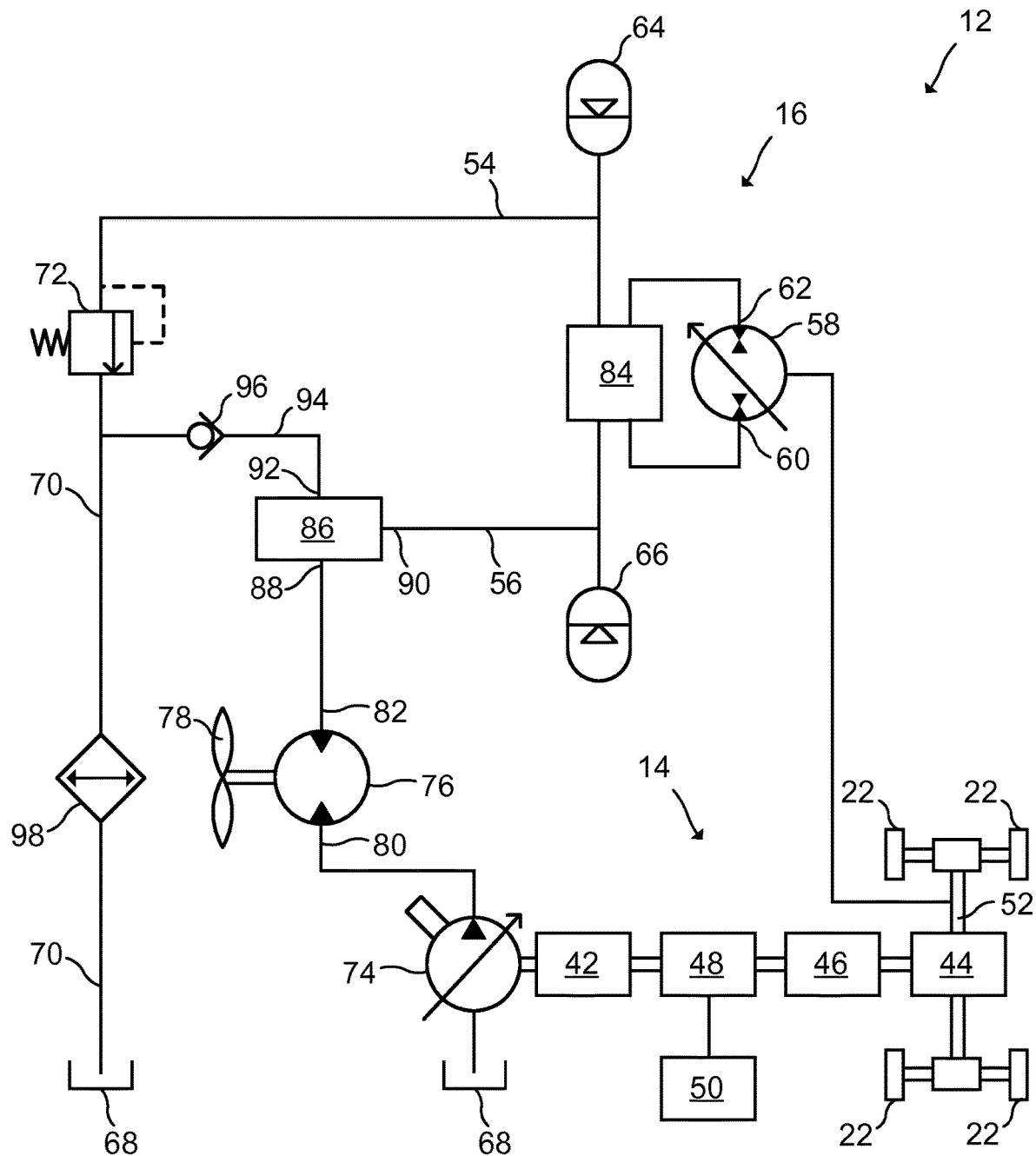
FIG. 2 is a block diagram of a hydraulic parallel hybrid driveline according to an embodiment of the invention comprising a mechanical driveline and a hydraulic energy handling system.

FIG. 2 is a block diagram of the hydraulic parallel hybrid driveline 12 in FIG. 1 comprising the mechanical driveline 14 and the hydraulic energy handling system 16. The mechanical driveline 14 comprises an internal combustion engine 42 and a gearbox 44. In this example, the mechanical driveline 14 further comprises a torque converter 46 between the internal combustion engine 42 and the gearbox 44. A power take-off (PTO) 48 is also provided between the internal combustion engine 42 and the torque converter 46 for driving hydraulic work functions 50, such as the hydraulic cylinders 26, 28, 38, 40 of the working machine 10. The wheels 22 of the working machine 10 are driven via a gearbox output shaft 52.

The hydraulic energy handling system 16 is connected to the mechanical driveline 14 with the purpose to store and release energy to boost the mechanical driveline 14. The hydraulic energy handling system 16 comprises a high-pressure side 54, a low-pressure side 56 and a hydraulic machine 58. In this example, the hydraulic machine 58 is a four quadrant hydraulic machine. Thus, the high-pressure side 54 and the low-pressure side 56 may be reversed.

The hydraulic machine 58 comprises a first side 60 and a second side 62. In case the hydraulic machine 58 operates as a pump (e.g. during braking of the working machine 10), the first side 60 is a suction side and the second side 62 is a discharge side. Throughout the present disclosure, the high-pressure side 54 and the low-pressure side 56 may be constituted by a high-pressure line and a low-pressure line, respectively.

The hydraulic energy handling system 16 further comprises a high-pressure hydraulic energy storage 64 connected to the high-pressure side 54. In this example, the high-pressure hydraulic energy storage 64 is a hydraulic accumulator. The hydraulic energy handling system 16 of this example further comprises an optional low-pressure hydraulic energy storage 66, also constituted by a hydraulic accumulator, connected to the low-pressure side 56.

The hydraulic energy handling system 16 further comprises a hydraulic tank 68 and a return line 70 for conducting hydraulic fluid to the hydraulic tank 68. Although two separate hydraulic tanks 68 are illustrated in FIG. 2, these hydraulic tanks 68 may be a common tank.

The hydraulic energy handling system 16 further comprises a pressure relief valve 72. The pressure relief valve 72 is connected between the high-pressure side 54 and the return line 70. The pressure relief valve 72 is normally closed and is configured to automatically open when a set pressure in the high-pressure side 54 is reached. In this example, the pressure relief valve 72 is hydromechanical.

The hydraulic energy handling system 16 further comprises a hydraulic pump 74 and a hydraulic motor 76. In this example, the hydraulic motor 76 is arranged to drive a fan 78 of the hydraulic energy handling system 16. The hydraulic motor 76 comprises an inlet side 80 and an outlet side 82. The hydraulic pump 74 is arranged to supply hydraulic fluid to the inlet side 80 of the hydraulic motor 76. In the example in FIG. 2, the hydraulic pump 74 is an auxiliary pump of the internal combustion engine 42, driven by a further PTO of the internal combustion engine 42. The hydraulic pump 74 may however be driven in alternative ways.

The hydraulic energy handling system 16 of this example further comprises a control valve arrangement 84. The control valve arrangement 84 is configured to selectively connect the hydraulic machine 58 to the high-pressure side 54. The control valve arrangement 84 is also configured to selectively connect the high-pressure side 54 to the low-pressure side 56. The control valve arrangement 84 may be realized in various ways. The control valve arrangement 84 may also be omitted. The hydraulic energy handling system 16 can for example operate without the ability to connect the high-pressure side 54 to the low-pressure side 56.

The hydraulic energy handling system 16 further comprises a priority valve arrangement 86. The priority valve arrangement 86 is connected to the outlet side 82 of the hydraulic motor 76. The hydraulic motor 76 and the priority valve arrangement 86 are thus arranged in series. In the example in FIG. 2, the outlet side 82 of the hydraulic motor 76 is directly connected to an inlet 88 of the priority valve arrangement 86. One or more additional hydraulic consumers (not shown) may however be provided between the hydraulic motor 76 and the priority valve arrangement 86.

The priority valve arrangement 86 is configured to direct a prioritized flow of hydraulic fluid to the low-pressure side 56. The priority valve arrangement 86 is also configured to direct an excess flow of hydraulic fluid from the outlet side 82 of the hydraulic motor 76 to the return line 70. To this end, the priority valve arrangement 86 comprises a priority flow outlet 90 connected to the low-pressure side 56, and an excess flow outlet 92 connected to a bypass line 94. The bypass line 94 is connected to the return line 70, downstream of the pressure relief valve 72. Thus, the priority valve arrangement 86 handles the distribution of flow of hydraulic fluid from the hydraulic motor 76 to either the low-pressure side 56 or the return line 70.

A check valve 96 is provided on the bypass line 94 that only allows flow of hydraulic fluid towards the return line 70. FIG. 2 further shows an oil cooler 98 provided on the return line 70. Throughout the present disclosure, the hydraulic pump 74, the hydraulic motor 76 and the priority valve arrangement 86 may be referred to as a supply system.

The hydraulic machine 58 is arranged to mechanically drive, and to be mechanically driven by, the mechanical driveline 14. The hydraulic machine 58 may for example always be driven by rotation of the gearbox output shaft 52. The discharge of hydraulic fluid from the hydraulic machine 58 can be varied by varying the displacement. As an alternative, the hydraulic machine 58 may be driven by (and drive) a shaft attached to the gearbox output shaft 52 via a planetary gear (not shown) and a clutch (not shown).

When storing energy from the mechanical driveline 14, the hydraulic machine 58 operates as a pump and transforms mechanical power from the mechanical driveline 14 into pressurized hydraulic fluid which is fed to the high-pressure hydraulic energy storage 64 via the control valve arrangement 84. This is for instance done when capturing braking energy from the working machine 10.

When the hydraulic machine 58 operates to pump hydraulic fluid to the high-pressure side 54, the first side 60 (in this case the suction side) of the hydraulic machine 58 needs a supply of pressurized hydraulic fluid. Some supply of pressurized hydraulic fluid to the hydraulic machine 58 may be provided by the optional low-pressure hydraulic energy storage 66. Thus, when storing energy in the high-pressure hydraulic energy storage 64, the low-pressure hydraulic energy storage 66 is emptied. When releasing the energy stored in high-pressure hydraulic energy storage 64, the high-pressure hydraulic energy storage 64 is emptied and the hydraulic machine 58, now operating as a hydraulic motor, transforms the hydraulic power to mechanical power to boost the mechanical driveline 14. During this process, the low-pressure hydraulic energy storage 66 is refilled.

The pressure relief valve 72 is connected to the high-pressure side 54 to be used as a "retarder valve" in order to maintain braking torque on the mechanical driveline 14 when the high-pressure hydraulic energy storage 64 is full. That is, the pressure relief valve 72 is arranged to discharge excess hydraulic energy from the high-pressure side 54 to the return line 70 in order to provide a braking force on the mechanical driveline 14.

As illustrated in FIG. 2, the pressure relief valve 72 is connected between the high-pressure side 54 and the return line 70. When a set pressure on the high-pressure side 54 is exceeded, the pressure relief valve 72 opens and discharges pressurized hydraulic fluid from the high-pressure side 54 to the return line 70. The hydraulic fluid is thereby throttled through the pressure relief valve 72. This throttling provides a braking force on the mechanical driveline 14. The hydraulic energy handling system 16 can thereby maintain a braking torque even when the high-pressure hydraulic energy storage 64 is full by throttling a flow of hydraulic fluid through the pressure relief valve 72. No additional software control is needed for this transition since the pressure relief valve 72 opens automatically when a certain pressure is reached.

One challenge with this type of retarder braking by means of the pressure relief valve 72 is that the hydraulic fluid leaves the hydraulic circuit comprising the high-pressure side 54 and the low-pressure side 56, in contrast to being cycled back and forth between the high-pressure side 54 and the low-pressure side 56. The hydraulic fluid is also heated when passing the pressure relief valve 72. The hydraulic machine 58 therefore needs to be supplied with cool pressurized fluid to the first side 60 (in this case the suction side) during the retarder braking, at least when the optional low-pressure hydraulic energy storage 66 is emptied. During retarder braking by means of the pressure relief valve 72, the priority valve arrangement 86, which is connected in series with the hydraulic motor 76, feeds the hydraulic machine 58 with cool pressurized hydraulic fluid to the first side 60.

When the pressure on the low-pressure side 56 increases after the pressure relief valve 72 is closed and the hydraulic machine 58 has stopped pumping, the priority valve arrangement 86 guides hydraulic fluid from the hydraulic motor 76 to the return line 70, in this example via the bypass line 94.

The hydraulic pump 74 can be used as a supply pump for the hydraulic energy handling system 16 without compromising the functionality of the fan 78. Since the already existing hydraulic pump 74 is used not only to drive the hydraulic motor 76 for the fan 78, but also to supply pressurized hydraulic fluid to the low-pressure side 56, costs associated with components that would otherwise be dedicated to this supply can be reduced, or avoided. Furthermore, the arrangement of the hydraulic motor 76 and the priority valve arrangement 86 in series allows the fan 78 to be operated at full speed even when a maximum supply flow of hydraulic fluid is required by the hydraulic machine 58.

In FIG. 2, the hydraulic motor 76 is arranged to drive the fan 78. However, a hydraulic motor according to the present invention, i.e. arranged in series with the priority valve arrangement 86, may be constituted by an alternative hydraulic motor of the working machine 10, such as a hydraulic motor for axle oil cooling, differential lock actuation, lubrication etc.

Figure 3:
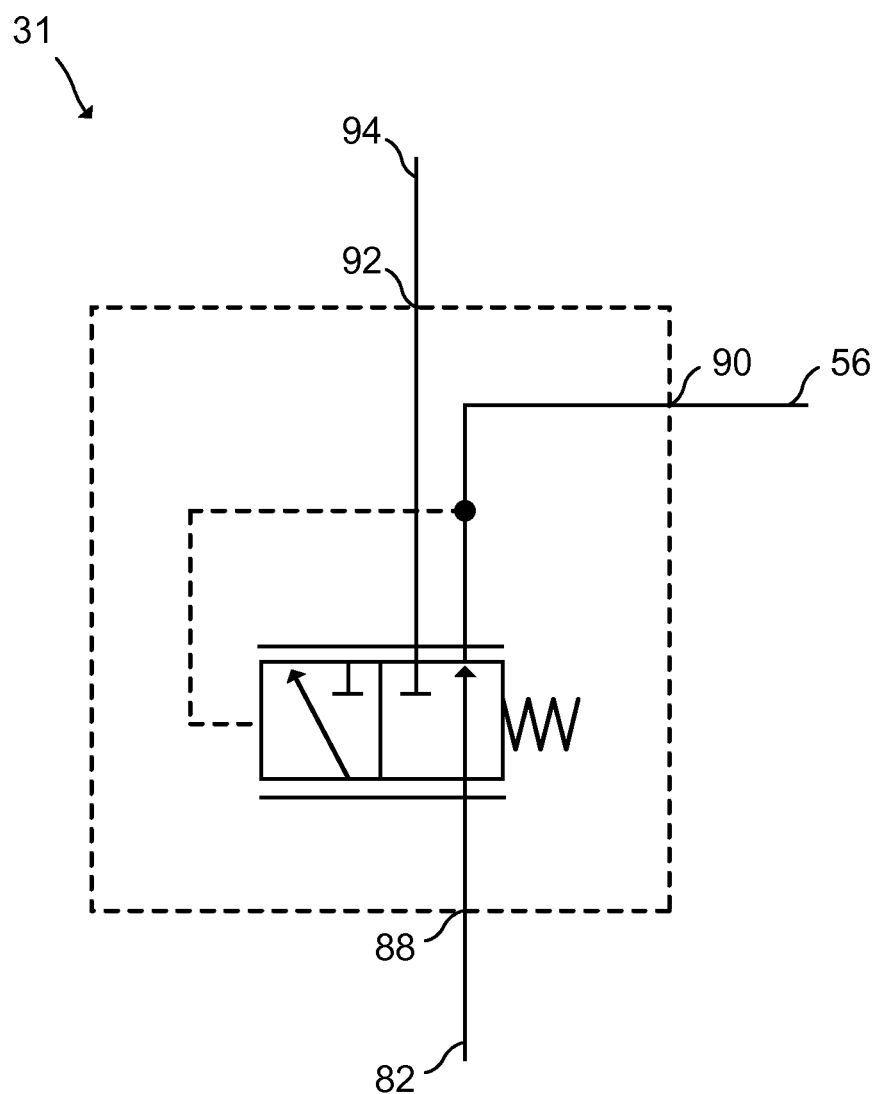
FIG. 3 is a block diagram of a priority valve arrangement according to an embodiment of the invention.

FIG. 3 is a block diagram of a priority valve arrangement 86 according to an embodiment of the invention. In this embodiment, the priority valve arrangement 86 is a hydromechanical priority valve.

As long as the set pressure on the low-pressure side 56 is below a threshold value, the inlet 88 is in fluid communication with the priority flow outlet 90 and hydraulic fluid is guided from the outlet side 82 of the hydraulic motor 76 to the low-pressure side 56. When the set pressure on the low-pressure side 56 exceeds the threshold value, the inlet 88 is brought in fluid communication with the excess flow outlet 92 and hydraulic fluid is guided from the outlet side 82 of the hydraulic motor 76 to the bypass line 94. The priority valve arrangement 86 is thereby configured to reduce the supply pressure of the hydraulic fluid on the low-pressure side 56 to a suitable level required by the hydraulic machine 58, and to direct the flow of hydraulic fluid to the bypass line 94 when this pressure level is reached. The priority valve arrangement 86 can be implemented without software control, and is consequently simpler and cheaper.

The priority valve arrangement 86 in FIG. 3 is merely one of several possible implementations of a priority valve arrangement 86 according to the present invention. Alternative types of priority valve arrangements 86 that also do not require software control are possible.

Figure 4:
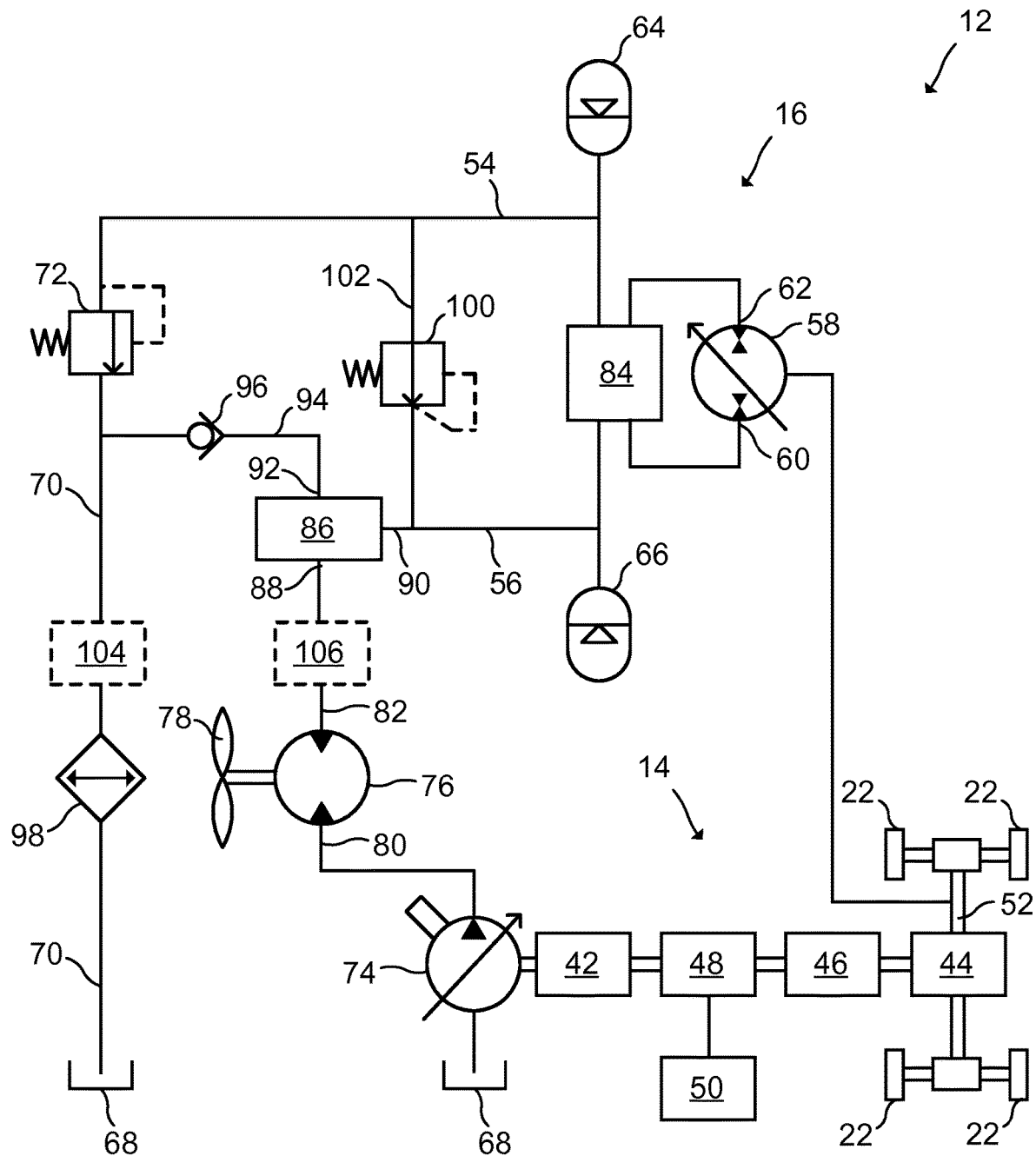
FIG. 4 is a block diagram of a hydraulic parallel hybrid driveline comprising a mechanical driveline and a further hydraulic energy handling system according to an embodiment of the invention.

FIG. 4 is a block diagram of a hydraulic parallel hybrid driveline 12 comprising a mechanical driveline 14 and a further hydraulic energy handling system 16 according to an embodiment of the invention. Mainly differences with respect to the embodiment in FIG. 2 will be described.

The hydraulic energy handling system 16 of this embodiment further comprises an anti-cavitation valve 100. The anti-cavitation valve 100 is arranged on a line 102 between the high-pressure side 54 and the low-pressure side 56. The anti-cavitation valve 100 is configured to allow hydraulic fluid to flow from the high-pressure side 54 to the low-pressure side 56 when a hydraulic pressure on the low-pressure side 56 falls below a cavitation threshold value.

When the pressure relief valve 72 is used as a retarder valve, e.g. during braking of the working machine 10, and the pressure on the low-pressure side 56 becomes critically low, the anti-cavitation valve 100 opens such that hydraulic fluid is guided from the high-pressure side 54 to the low-pressure side 56. The reason for this pressure drop on the low-pressure side 56, despite the hydraulic motor 76 and the priority valve arrangement 86, may be that the pressure relief valve 72 is used for retarder braking during a long time, e.g. during a long downhill slope, and/or that the flow from the hydraulic pump 74 is limited and cannot supply the same amount of hydraulic fluid as is pumped by the hydraulic machine 58. If such pressure drop on the low-pressure side 56 happens, the anti-cavitation valve 100 will open and a part of the flow of hydraulic fluid on the high-pressure side 54 will be circulated directly to the low-pressure side 56.

FIG. 4 further shows the positioning of two additional optional hydraulic consumers 104, 106 that can be fed with hydraulic fluid by the hydraulic energy handling system 16. One hydraulic consumer 106 is positioned on the outlet side 82 of the hydraulic motor 76, i.e. between the hydraulic motor 76 and the priority valve arrangement 86. One hydraulic consumer 104 is positioned on the return line 70, upstream of the oil cooler 98.

It is to be understood that the present invention is not limited to the embodiments described above and illustrated in the drawings; rather, the skilled person will recognize that many changes and modifications may be made within the scope of the appended claims.

The invention claimed is:

1. A hydraulic energy handling system for a working machine (10), the hydraulic energy handling system comprising:
   a high-pressure side;
   a low-pressure side;
   a hydraulic machine for mechanically driving, and being mechanically driven by, a mechanical driveline of the working machine;
   at least one high-pressure hydraulic energy storage connected to the high-pressure side;
   a hydraulic motor having an inlet side and an outlet side;
   a hydraulic pump arranged to supply hydraulic fluid to the inlet side of the hydraulic motor; and
   a return line for conducting hydraulic fluid to a hydraulic tank;
   wherein the hydraulic energy handling system further comprises:
   a pressure relief valve connected between the high-pressure side and the return line, the pressure relief valve being arranged to discharge excess hydraulic energy from the high-pressure side to the return line in order to provide a braking force on the mechanical driveline; and
   a priority valve arrangement connected to the outlet side of the hydraulic motor, the priority valve arrangement being configured to direct a prioritized flow of hydraulic fluid to the low-pressure side.

2. The hydraulic energy handling system according to claim 1, wherein the pressure relief valve is hydromechanical.

3. The hydraulic energy handling system according to claim 1, further comprising a fan and wherein the hydraulic motor is arranged to drive the fan.

4. The hydraulic energy handling system according to claim 1, wherein the priority valve arrangement is configured to direct an excess flow of hydraulic fluid from the outlet side of the hydraulic motor to the return line.

5. The hydraulic energy handling system according to claim 1, wherein the priority valve arrangement comprises a hydromechanical priority valve.

6. The hydraulic energy handling system according to claim 1, further comprising an anti-cavitation valve configured to allow hydraulic fluid to flow from the high-pressure side to the low-pressure side when a hydraulic pressure on the low-pressure side falls below a cavitation threshold value.

7. The hydraulic energy handling system according to claim 1, wherein each of the at least one high-pressure hydraulic energy storage is a hydraulic accumulator.

8. The hydraulic energy handling system according to claim 1, further comprising at least one low-pressure hydraulic energy storage connected to the low-pressure side.

9. The hydraulic energy handling system according to claim 8, wherein each of the at least one low-pressure hydraulic energy storage is a hydraulic accumulator.

10. The hydraulic energy handling system according to claim 1, further comprising a control valve arrangement configured to selectively connect the hydraulic machine to the high-pressure side.

11. The hydraulic energy handling system according to claim 10, wherein the control valve arrangement is further configured to selectively connect the high-pressure side to the low-pressure side.

12. A hydraulic parallel hybrid driveline for a working machine, the hydraulic parallel hybrid driveline comprising a mechanical driveline and a hydraulic energy handling system according to claim 1.

13. The hydraulic parallel hybrid driveline according to claim 12, wherein the mechanical driveline comprises a gearbox having a gearbox output shaft, and wherein the hydraulic machine is arranged to mechanically drive, and to be mechanically driven by, the gearbox output shaft.

14. The hydraulic parallel hybrid driveline according to claim 12 or 11, further comprising an internal combustion engine, and wherein the hydraulic pump is driven by the internal combustion engine.

15. A working machine comprising a hydraulic energy handling system according to claim 1.

16. A working machine comprising a hydraulic parallel hybrid driveline according to claim 12.

* * * * *